Aug. 11, 1970
C. C. MOORE
3,523,438
APPARATUS FOR COILING A BAR FOR USE IN MAKING A BEARING ASSEMBLY
Original Filed Sept. 22, 1965
2 Sheets-Sheet 1
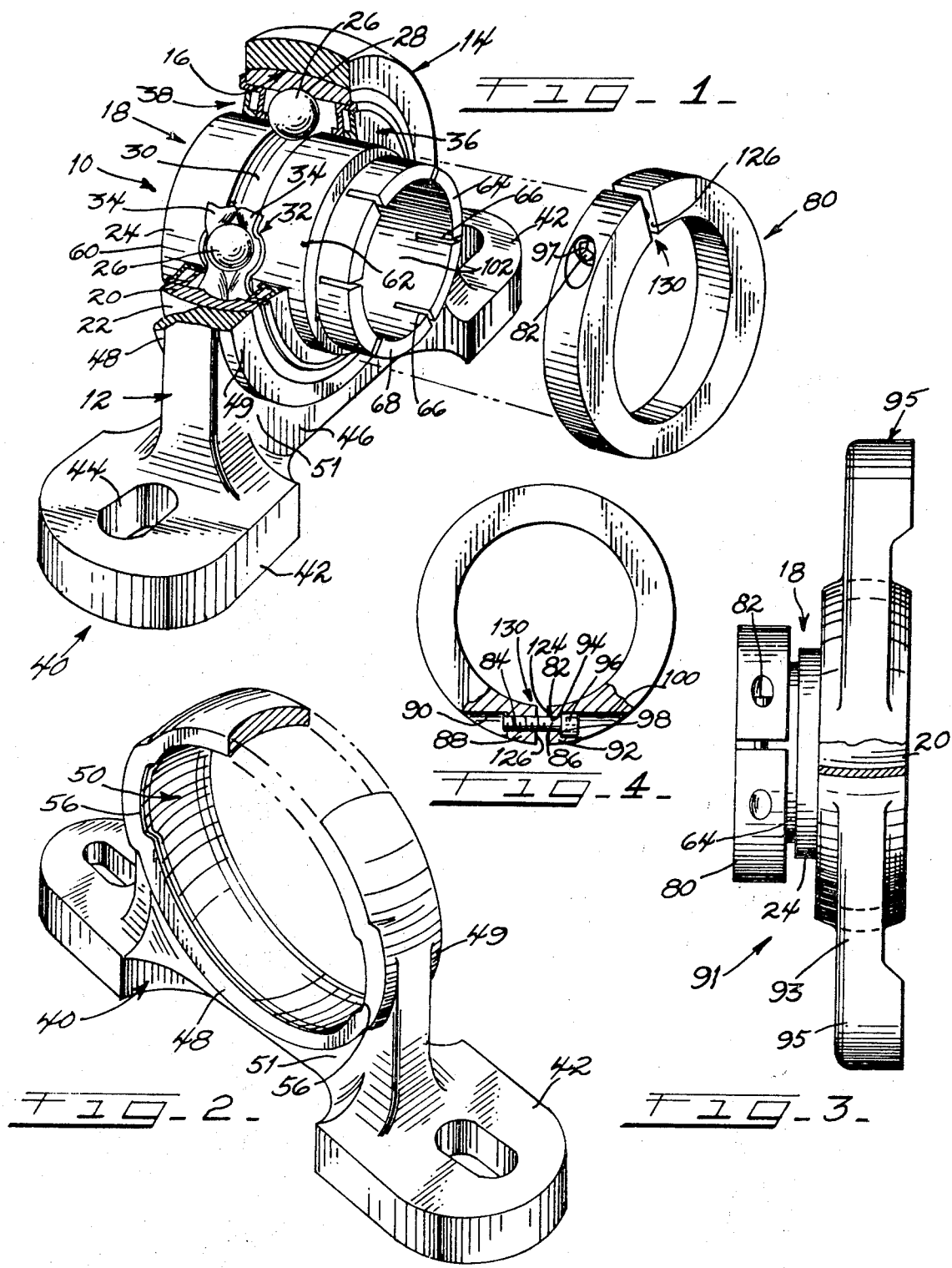
INVENTOR
CHESTER C. MOORE
BY *Mann Brown & McWilliams*
ATT'YS

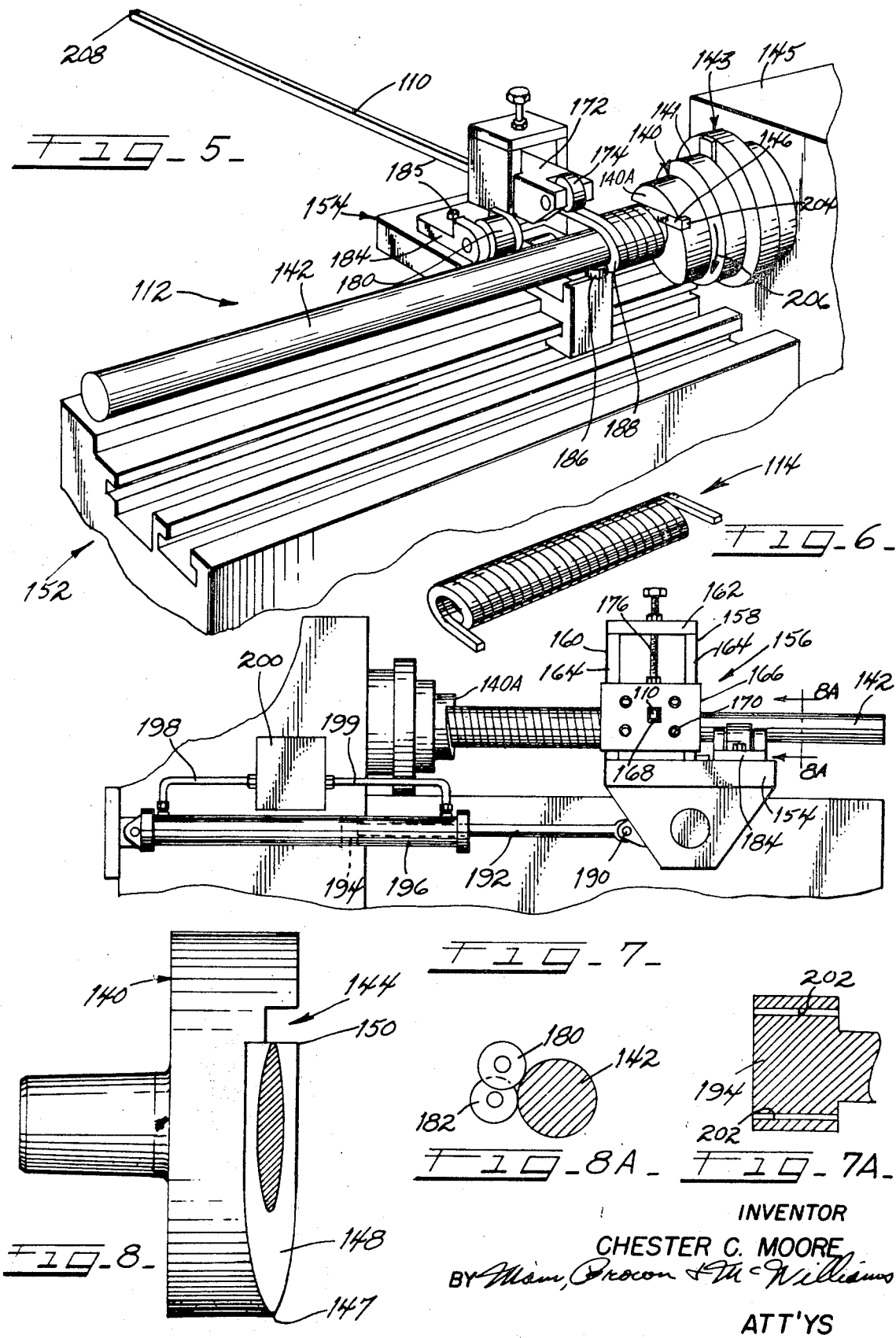

United States Patent Office 3,523,438
Patented Aug. 11, 1970

1

3,523,438
APPARATUS FOR COILING A BAR FOR USE
IN MAKING A BEARING ASSEMBLY
Chester C. Moore, Aurora, Ill., assignor, by mesne assignments, to Borg-Warner Corporation, Chicago, Ill., a corporation of Delaware
Original application Sept. 22, 1965, Ser. No. 489,141, now Patent No. 3,373,427, dated Mar. 19, 1968. Divided and this application June 9, 1967, Ser. No. 661,155
Int. Cl. B21f 3/04
U.S. Cl. 72—144                        2 Claims

ABSTRACT OF THE DISCLOSURE

A method of making a ball bearing assembly and apparatus for use in making a locking collar therefor, in which the ball bearing assembly is concerned with using a special inner race member that receives a shaft or the like to be journaled and has at least one end of same formed with a plurality of spaced slots extending longitudinally thereof, assembling an outer race and bearing balls in abutting relation therewith, and applying a C-shaped clamping collar to the inner race slotted end portion and clamping the collar against the inner race to lock the inner race to the shaft or the like. The apparatus for use in making the locking collar involves the forming of a bar into a coiled helix by securing one end of the bar to a rotating head with the bar extending at right hangles to the axis of rotation of the head, rotating the head while holding the bar against rotation of movement, and while the head rotates, simultaneously winding the bar on an arbor and camming the bar to define a helix of uniform pitch along the arbor.

This application is a division of my application Ser. No. 489,141, filed Sept. 22, 1965, now Pat. No. 3,373,427, granted Mar. 19, 1968.

My invention relates to an apparatus for coiling a bar as part of a method of making the locking collar of said application, and more particularly, to an apparatus for coiling a bar to make locking collars for making ball bearing devices of the type employing inner race rings and a locking collar for securing the inner race ring to a shaft.

Heretofore ball bearing units of the type shown in Richmond Pat. 3,189,979, granted June 22, 1965, have been arranged to have their inner races secured to the shaft by set screws or by cam action devices, which not only have tended to cock the inner race somewhat off the axial center of the shaft, but also frequently in a cocked position. This has been the source of an undue amount of vibration on the shaft and bearing, and has frequently resulted in fretting corrosion that causes the inner race to become frozen to the shaft; also, a marring and moving away of the shaft itself frequently results, which sometimes results in having to replace the shaft.

A principal object of the invention of said application is to provide a bearing assembly arrangement in which the inner race may be firmly secured to the shaft in perfect axial alignment therewith.

A principal object of the present invention is to provide as part of a method of making locking collars for use in connection with ball bearing assemblies a method and apparatus for coiling bar stock from which the locking collar is made that substantially reduces the cost of manufacture of the bearing and provides a product of uniformly high quality characteristics.

Other objects of the invention are to provide a locking collar arrangement that is economical of manufacture, efficient and long lived in use and susceptible of a wide variety of applications.

2

Other objects, uses, and advantages will be obvious or become apparent from a consideration of the following detailed description and the application drawings.

In the drawings:
FIG. 1 is a perspective view, partially in section, showing a completed ball bearing pillow block type unit of the type to which this invention relates, showing the locking collar of this unit displaced from its locking position on the bearing assembly inner race;
FIG. 2 is a perspective view, partially in section, showing one form of pillow block housing that may be used in the fabrication of pillow block ball bearing units arranged in accordance with this invention;
FIG. 3 is a side elevational view of a flange type ball bearing unit equipped with the ball bearing assembly of FIG. 1;
FIG. 4 is a plan view of the locking collar employed in connection with the ball bearing assembly of FIG. 1, with parts being shown in section;
FIG. 5 is a diagrammatic perspective view illustrating an initial step in the method of making the locking collar of FIG. 4 in accordance with this invention;
FIG. 6 is a diagrammatic perspective view of the intermediate product resulting from the procedure illustrated in FIG. 5;
FIG. 7 is a side elevational view of the apparatus as shown in FIG. 5 taken from the rear of FIG. 5;
FIG. 7A is a fragmental cross-sectional view of a dashpot device piston employed in the device of FIGS. 5–7;
FIG. 8 is an enlarged elevational view of the rotating convoluting head that forms a part of the apparatus shown in FIG. 5; and
FIG. 8A is a diagram illustrating the arbor bracing roller arrangement used in the apparatus of FIGS. 5–7, taken substantially along line 8A—8A of FIG. 7.

However, it is to be distinctly understood that the specific drawing illustrations provided are supplied primarily to comply with the requirements of the Patent Code, and that the invention may have other specific embodiments which are intended to be covered by the appended claims.

GENERAL DESCRIPTION OF BEARING UNIT

Referring now more specifically to FIGS. 1–4 of the drawings, reference numeral 10 generally indicates a pillow block ball bearing unit of the type that may be made by practicing my invention.

The bearing unit 10 generally comprises a pillow block type housing 12 provided with an annular housing portion 14 that in the form shown is provided with a spherically contoured bearing seat 16 in which is swivably mounted a ball bearing assembly 18 arranged in accordance with this invention.

The ball bearing assembly 18 comprises an outer race 20 provided with a spherically contoured external surface or periphery 22 that is complementary to and coacts with the housing portion bearing seat 16, an inner race 24, a plurality of bearing balls 26 mounted in the ball race grooves 28 and 30 of the respective races, a suitable type of ball retainer devices 32, which in the form shown comprises a pair of rings 34 that are formed and riveted or clamped together in any conventional manner to space the balls 26 equidistantly from each other, and sealing ring assemblies 36 and 38 applied between the inner and outer races on either side of the ball bearing assembly to form a seal for the bearing unit.

The housing 12 further comprises a base 40 provided with a pair of feet or lugs 42 that are formed with suitable openings 44 for the reception of mounting screws or bolts or the like. The annular housing portion 14 of the pillow block housing 12 defines an opening 50, and is connected to the feed or lugs 42 by an upstanding vertical wall portion 46, and in the form shown, the annular housing portion 14 defines end portions 48 and 49 that project beyond the side surfaces 51 of the wall portion 46.

As indicated in FIG. 2, the end portion 48 of the housing portion 14 is formed with loading slots 56 for receiving preassembled bearing assemblies 18.

The housing 12 as shown in FIG. 2 may be made in accordance with the teachings of said Richmond patent (the disclosure of which is incorporated herein by this reference), and when so made, is adapted to receive ball bearing assemblies that are assembled in accordance with this invention.

METHOD OF MAKING BEARING UNIT

The housing 12 is cast or formed from a suitable ductile or malleable material, such as ductile cast iron, nodular iron, malleable cast iron, perlitic malleable iron, Mechanite, bronze, aluminum bronze or the like.

The inner race 24 is formed from steel, with the zone of the inner race that defines the raceway 30 being hardened in any suitable manner, leaving the end portions 60 and 62 unhardened, and thus relatively soft as compared to the hardened raceway. The end portion 62 is formed with an annular flange portion or extension 64 of reduced external diameter that is formed with a plurality of slots 66 that extend longitudinally of the axis of the inner race and that are equally spaced about the circumference of the inner race. The slots 66 define resilient gripping fingers 68 that are employed to clamp the inner race 24 to a shaft over which the inner race is received in the normal operating position of bearing unit 10.

The bearing assembly 18 is assembled by taking the inner race 24 and placing it within the outer race 22 and applying a plurality of bearing balls 26 therebetween in any convenient manner. The retaining rings 34 are inserted from the sides of the assembly and are riveted or clamped together in any conventional manner to properly hold the balls 26 in their proper spaced relationship within the bearing grooves. The bearing assembly is then sealed by applying the seal assemblies 36 and 38 in any known manner.

The thus assembled bearing assembly is applied to the housing 12 by turning the assembly so that its plane extends perpendicular to the plane of the housing portion 14, and then inserting the outer race 22 into the loading slots 56 until the center of the outer race is substantially aligned with the center of the bearing seat 16. The bearing assembly 18 may then be rotated 90 degrees into substantial coplanar relation with the housing portion 14, and locking collar 80 arranged and made in accordance with this invention is applied over extension 64 to serve as a device to clamp the inner race to the shaft it cooperates with. Locking collar 80 includes a cap screw 82, that has a threaded portion 84 of its stem or body 86 screw threadedly received in an end portion 88 of the collar so that the collar can be contracted against the fingers 68 to clamp the inner race to a shaft.

The locking collar end portion 88 is recessed or enlarged as at 90, and the other end portion 92 of the locking collar is formed with a bore 94 through which cap screw 82 extends, with the head 96 of the cap screw seating against a shoulder 98 that is defined by a recess 100 formed in the end portion 92.

In use, the bearing unit 10 as shown in FIG. 1 with the locking collar 80 slipped in place over the fingers 68 is applied to the shaft the bearing unit is to journal by slipping the shaft through the bore 102 of the inner race, and after the shaft and bearing unit have been appropriately positioned with respect to each other, a suitable turning tool is applied to the cap screw 82 to contact the collar 80 against the fingers 68 and draw the fingers 68 into tight clamping engagement with the shaft surface. Cap screw 82 has its head 96 formed with a suitably shaped polygonal indentation 97 adapted to cooperate with a complementarily shaped tool for this purpose.

The result is that the inner race is securely made fast to the shaft in exact axial alignment therewith and without marring or damaging the surface of the shaft in any way.

FIG. 3 shows a flange type bearing unit 91 that includes flange type housing 93 having a bearing assembly 18 including a locking collar 80 applied thereto. Housing 93 differs from housing 12 primarily in that it is provided with lugs 95 adapted for flange type bearing applications. Unit 91 is otherwise the same as unit 10, as indicated by corresponding reference numerals, assembly 18 being applied through loading slots (not shown) that are the same as loading slots 56 of FIG. 2. Unit 91 is thus assembled following the same steps described above.

The locking collar 80 is preferably made in the manner more fully described in my said application (the disclosure of which is hereby incorporated herein by this reference), the disclosurue of the instant application being directed to the method and apparatus employed to coil the bar stock employed for this purpose.

Referring to FIGS. 5-8, a section of bar stock 110 of square section is applied to a coiling apparatus 112 that is shown in FIGS. 5-8 to coil the bar stock 110 into a tight helix, an example of which is shown at 114 in FIG. 6. The helix after being formed in accordance with the present invention, is removed from apparatus 112 and is split to form individual lock washer shaped collar blanks by employing the cutting apparatus 116 illustrated in FIGS. 9 and 10 of my said application, after which the individual blanks 118 there illustrated are flattened by employing the die apparatus shown in FIG. 12, of said application, and then the blanks are individually coined to the final locking collar external and internal diameters by employing the die apparatus 122 shown in FIGS. 15-17 of my said application.

The individual locking collar blanks are then processed in the manner indicated in FIGS. 18-23 of said application to form the recesses and holes in the locking collar that receive the cap screw 82, and in the course of this processing, the end portions 88 and 92 of the locking collar are formed with oppositely disposed planar surfaces 124 and 126 (see FIG. 4) that define the gap 130 between the end portions of the locking collar.

The individual locking collars are then tumbled and coated as may be necessary or desirable, after which the individual cap screws are applied to the respective locking collars.

APPARATUS FOR COILING THE BAR STOCK

Referring now more specifically to FIGS. 5-8, the apparatus 112 comprises a rotating head 140 carrying an elongate arbor 142 projecting from its free face 143, which arbor 142 that is aligned with the axis of rotation of the head 140 and is affixed to the rotating head for rotation therewith in any suitable manner. Head 140 is secured in a suitable collet or the like device 141 that forms part of a rotatable structure 143 that is suitably mounted in housing structure 145 containing suitable means for rotating head 140.

The rotating head 140 at its face 140A is formed with a slot 144 extending crosswise to the arbor 142, which slot 144 is proportioned to complement the bar stock being coiled, which is in tangent relation to the arbor 142, and which receives the end 146 of the bar stock that is initially applied to the apparatus 112.

The rotating head 140, between the slot 144 and the diametrically opposite side 147 of the head, is formed with a planar pitch forming surface 148 that preferably makes an angle with respect to the axis of rotation of the head that lies in the range of about 81 to about 84 degrees, with the angled surface 148 being oriented to have its plane intersect the undercorner 150 of recess 144 (see FIG. 8) and extend axially of the direction of rotation away from the arbor 142.

A bed structure 152 is mounted underneath the rotating head 140 on which is slidably mounted a carriage 154 carrying a bar stock feed guide structure 156 in the form of a frame including side plates 158 and 160, suitably affixed to the carriage structure 154, and braced at their upper ends by a top plate 162 that is secured to the respective plates 158 and 150 by screws or the like.

Mounted between the plates 158 and 160 at their sides 164 is a guide plate 166 formed with a quadrilateral guide opening 168 through which the bar stock 110 is inserted on being applied to the groove or recess 144.

Mounted between the plates 158 and 160 as by bolts 170 is a support block 172 for a guide roller 174. Support block 172 is braced against the stock 110 by a bolt 176, which is positioned so that when the recess or slot 144 is horizontally disposed and carriage 154 is moved to the right of FIG. 5 to position the guide opening 168 in alignment with the recess 144, the end 146 of the bar stock 110 may be readily inserted through the guide post 168 under roller 174 and into and through the slot 144.

The rear plate 166 should thus be positioned so that the guide opening 168 is horizontally aligned with recess 144 when the recess or slot 144 is horizontally disposed.

The carriage structure 154 also has applied thereto a pair of bracing rollers 180 and 182, which are journalled on a bracket structure 184 that is releasably mounted for movement toward and away from the arbor 142 as by employing bolts 185. The relation of bracing rollers 180 and 182 to arbor 142 is indicated diagrammatically in FIG. 8A, and while the specifics of the journalling of roller 182 are omitted to simplify the drawings, it is intended that it be journalled on and move with bracket structure 184.

The carriage structure 154 journals a roller 186 that is disposed immediately under the arbor 142 and is positioned to engage the side surface 188 of the bar stock as it is being coiled by apparatus 112.

Carriage structure 154 is connected by pin 190 (see FIG. 7) to piston rod 192 of a piston 194 received in hydraulic cylinder 196 that is fixedly secured in any suitable manner to one side of the apparatus 112, with conduits 198 and 199 communicating between either side of the piston 194 and a suitable pump 200. The piston 194 is formed with one or more passages 202 (see FIG. 7A) extending through from the head side to the crank side thereof to permit hydraulic liquid to flow therethrough as the rod 192 is drawn outwardly of the cylinder 196.

In use, apparatus 112 is set to convolute a piece of bar stock 110 to the shape shown in FIG. 6 by employing pump 200 to pump hydraulic liquid into the cylinder 196 at the crank side of piston 194 (the right hand side thereof as viewed in FIG. 7) to return thea carriage 154 to the right of FIG. 7 to the point where guide opening 168 is in alignment with the vertical plane of rotatable head groove or recess 144. The groove or recess 144 is then horizontally disposed and the end 146 of the bar stock 110 inserted through opening 168 and disposed within the recess or groove 144 to the extent that the terminal portion 204 thereof is positioned approximately adjacent the corner 150 of the recess or groove 144. In addition, the bracket structure 184 that mounts the rollers 180 and 182 is disposed so that the rollers 180 and 182 contact the arbor 142.

The head 140 is then rotated in the direction of the arrow 206, with the result that since the stock 110 is held against rotation by the carriage 154, the bar 110 is bent about the arbor 142, and as the head 140 continues to turn, the surface 148 cams the first turn of the bar to the pitch dictated by the 6 to 9 degree deviation of the surface 148 from a right-angled position with respect to the arbor 142.

As the first turn of the bar is formed, the surface 188 of the bar contacts roller 186 with the result that the pitch being applied to the coiled portion of the bar biases the carriage 154 to the left of FIG. 5 and the right of FIG. 7.

As the head 140 continues to rotate, the bar 110 continues to be wound on the arbor 142 in a tight helix until the rear end 208 of the bar slips past the roller 174, at which point the intermediate product shown in FIG. 6 is provided. Rollers 180 and 182 brace the arbor against reaction forces acting on it that tend to throw it out of the axis of rotation of head 140.

As the carriage 154 is moved to the left of FIG. 5 and the right of FIG. 7 under the biasing action of the roller 186 engagement with the surface 188 of the bar, a dash-pot holding effect is provided on the movement of the carriage 154 through the action of hydraulic liquid passing through the passages 202 of the piston 194.

Product 114 is then removed from arbor 142, after the bracket structure 184 has been loosened so that rollers 180 and 182 may be moved out of the way.

It will therefore be seen that I have provided novel and effective ways of making or assembling ball bearing assemblies and units, as well as a novel effective and inexpensive method of making locking collars therefor including a novel apparatus for coiling bar stock to make the locking collar.

The bearing assembly arrangements shown in FIGS. 1 and 3 not only affix the inner race of the bearing assembly to the shaft in substantially perfect axial alignment with the axis of the shaft, the inner race is firmly clamped against any possible movement by merely suitably positioning the cap screw 82 so that the inner race clamping fingers 68 are drawn against the shaft surface.

As I prefer to apply the ball bearing assemblies 18 to the housings 12 through the housing loading slots 56, the overall length of the inner race, when assembled to the outer race in the manner shown in FIG. 1, must not extend at any point beyond the imaginary sphere that is defined by a projection of the contour of bearing seat 16 and outer race surface 22.

The bearing arrangements shown in FIGS. 1 and 3 of the drawings are also adapted for application to undersized or worn shafts and provided an appropriate gripping action even though the shaft tolerance difference may be excess of two or three thousandths.

The units 10 and 91 represent only several of the specific types of housing units to which ball bearing assemblies 18 and their locking collars may be applied. Furthermore, in some applications it is not necessary that the assembly 18 be swivelly mounted, and in such cases the external surface of the outer race need not be spherically contoured.

It frequently happens that assemblies 18 and their locking collars 80 are sold separately from their housings, in which case the locking collars may be assembled on the respective assemblies 18 for facilitating shipping purposes.

Assemblies 18 may be applied to the housings of FIGS. 1 and 3 by following the methods of Glavan et al., Pat. 2,952,898 to provide an alternate method of making these assemblies.

The method of making the locking collar herein disclosed has been found to make it possible to produce locking collars at a fraction of the cost of making them by a straight screw machine operation. Furthermore, machining of the locking collar is held to a minimum and the dimensioning of the internal and external diameters can be achieved with a tolerance and smoothness not possible in employing a screw machine.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A machine for coiling an elongate bar, said machine comprising:

a rotatable head and means for rotating said head in a predetermined direction of rotation, an arbor carried by said head and aligned with the axis of rotation of said head, said head defining a face extending generally transversely of said axis and said arbor projecting from said head face, said head having formed therein a rectilinear slot proportioned to receive one end of said bar, said slot being formed in said face to one side of said arbor and extending at right angles to and tangent to said arbor, said slot intersecting an edge portion of said head at the periphery thereof to define a corner portion that lies in a plane that parallels said slot and is tangent to said arbor, a carriage positioned adjacent said head on one side of said arbor and mounted for reciprocating movement in a direction parallel to said axis, said carriage carrying a bar movement guide device adapted to be aligned with said slot when said guide device is at a position adjacent said head, said guide device defining a feed port through which the bar to be coiled extends when the bar is to be coiled by the machine, said port being fixed with respect to said carriage and defining a feed passage extending at right angles to, and tangent to, said arbor, said port being alignable with said slot at said position of said carriage, said carriage carrying a roller positioned for engagement with the bar being coiled at the side portion thereof facing away from said head when the bar is positioned to extend through said port into said slot in said position of said carriage, said head face being formed with a planar surface extending between said slot and the other side of said arbor, said surface being at an angle with respect to said axis that is in the range of from about 81 to about 84 degrees, said surface intersecting said corner portion and intersecting said axis in substantial alignment with said slot transversely of said head, said surface defining a bearing area of said face that is engaged by one side of the bar, when the bar is applied to said guide device and said slot, and on rotation of said head in said direction that defines the pitch of the coiling taking place in the bar as the bar winds up on said arbor due to said rotation of said arbor, whereby said bar is applied to said feed port and said slot at right angles to said arbor, and said area of said face, on rotation of said head, defines the pitch of the coiling formed in the bar.

2. The machine set forth in claim 1 including:

dash-pot means acting on said carriage for resisting movement thereof away from said head longitudinally of said arbor and including means for hydraulically returning said carriage toward said head on removal of the coiled bar from said arbor.

References Cited

UNITED STATES PATENTS

| | | | |
|---|---|---|---|
| 379,393 | 3/1888 | Harvey | 72—144 |
| 561,579 | 6/1896 | Gare | 72—142 |
| 2,649,130 | 8/1953 | Border | 72—145 |
| 2,811,193 | 10/1957 | Iversen | 72—144 |

RICHARD J. HERBST, Primary Examiner